(12) United States Patent
Jang et al.

(10) Patent No.: US 11,745,653 B2
(45) Date of Patent: Sep. 5, 2023

(54) APPARATUS AND METHOD FOR DRIVER DISTRACTION WARNING

(71) Applicant: HYUNDAI MOBIS CO., LTD., Seoul (KR)

(72) Inventors: Young Min Jang, Yongin-si (KR); Tae Yoon Son, Anyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/363,456

(22) Filed: Jun. 30, 2021

(65) Prior Publication Data
US 2021/0402923 A1    Dec. 30, 2021

(30) Foreign Application Priority Data

Jun. 30, 2020 (KR) .......................... 10-2020-0080608

(51) Int. Cl.
*B60Q 1/00* (2006.01)
*B60Q 9/00* (2006.01)
(Continued)

(52) U.S. Cl.
CPC .............. *B60Q 9/00* (2013.01); *G06F 18/25* (2023.01); *G06V 20/56* (2022.01); *G06V 20/597* (2022.01); *G06V 40/19* (2022.01); *G01S 19/42* (2013.01)

(58) Field of Classification Search
CPC ........ B60Q 9/00; G06V 20/597; G06V 40/19; G06V 20/56; G06K 9/6288; G01S 19/42
(Continued)

(56) References Cited

U.S. PATENT DOCUMENTS 11,001,231 B1 * 5/2021 Hedman ................ B60S 1/0844
11,193,312 B1 * 12/2021 Weng ..................... G06V 20/59
(Continued)

FOREIGN PATENT DOCUMENTS

| CN | 103110400 | 5/2013 |
| CN | 105825621 | 8/2016 |

(Continued)

OTHER PUBLICATIONS

English Language Abstract of KR 10-2019-0050633 published May 13, 2019.
(Continued)

*Primary Examiner* — Naomi J Small
(74) *Attorney, Agent, or Firm* — DLA PIPER LLP (US)

(57) ABSTRACT

The present invention relates to an apparatus and method of providing a warning about driver distraction. The apparatus for providing the warning about driver distraction according to the present invention includes an input unit configured to receive visual field-related information, driving environment information, and driving-related information, a memory configured to store a warning providing program for a driver's distraction situation using the visual field-related information, the driving environment information, and the driving-related information, and a processor configured to execute the warning providing program. The processor changes warning determination parameters for driver distraction and provides a warning alarm about the driver distraction.

10 Claims, 2 Drawing Sheets

(51) Int. Cl.
*G06V 20/59* (2022.01)
*G06V 40/19* (2022.01)
*G06V 20/56* (2022.01)
*G06F 18/25* (2023.01)
*G01S 19/42* (2010.01)

(58) Field of Classification Search
USPC .................................................. 340/439
See application file for complete search history.

(56) References Cited

U.S. PATENT DOCUMENTS

| | | | |
|---|---|---|---|
| 11,422,551 B2* | 8/2022 | Swan | A63F 13/44 |
| 11,455,810 B2* | 9/2022 | Edwards | G06F 3/013 |
| 2015/0092056 A1* | 4/2015 | Rau | B60R 11/04 |
| | | | 348/148 |
| 2015/0158427 A1 | 6/2015 | Lee et al. | |
| 2016/0221502 A1* | 8/2016 | Gordon | G06V 20/597 |
| 2016/0306173 A1* | 10/2016 | Tsukahara | G02B 27/0172 |
| 2018/0186214 A1* | 7/2018 | Chundrlik, Jr. | G08G 1/166 |
| 2019/0038204 A1 | 2/2019 | Beck et al. | |
| 2019/0191149 A1* | 6/2019 | Lee | H04N 13/371 |
| 2019/0266751 A1* | 8/2019 | Noble | G06T 7/60 |
| 2020/0057487 A1 | 2/2020 | Sicconi et al. | |
| 2021/0057058 A1* | 2/2021 | Liu | G06F 16/24573 |
| 2021/0394775 A1* | 12/2021 | Julian | G08G 1/164 |
| 2021/0401340 A1* | 12/2021 | Gallagher | A61B 5/742 |

FOREIGN PATENT DOCUMENTS

| | | |
|---|---|---|
| CN | 109774598 | 5/2019 |
| CN | 109808696 | 5/2019 |
| CN | 111107309 | 5/2020 |
| KR | 10-2019-0050633 | 5/2019 |

OTHER PUBLICATIONS

English Language Abstract of CN 103110400 published May 22, 2013.
English Language Abstract of CN 105825621 published Aug. 3, 2016.
English Language Abstract of CN 109774598 published May 21, 2019.
English Language Abstract of CN 109808696 published May 28, 2019.
English Language Abstract of CN 111107309 published May 5, 2020.

* cited by examiner

APPARATUS AND METHOD FOR DRIVER DISTRACTION WARNING

CROSS-REFERENCE TO RELATED APPLICATION

This application claims priority to and the benefit of Korean Patent Application No. 10-2020-0080608, filed on Jun. 30, 2020, the disclosure of which is incorporated herein by reference in its entirety.

BACKGROUND

Field of the Invention

The present invention relates to an apparatus and method for providing a warning about driver distraction.

Discussion of Related Art

In camera-based driver distraction warning techniques according to the related art, whether a driver distraction situation such as lane departure, eye closing, or the like occurs is determined based on determination rules, and a warning about the situation is provided.

According to the related art, warnings are provided based on a front area, a vehicle speed, and a departure time defined by producers, and warnings are also provided according to an eye closing time defined by the producers.

That is, according to the related art, there is a problem in that, in order to provide a warning about a driver distraction situation, parameters for determining whether distraction occurs are arbitrarily defined, and the provision of warnings related to distraction are generalized according to the parameters defined by designers.

Accordingly, there are problems in that the generalized determination parameters cannot satisfy a large number of drivers around the world, can generate an erroneous warning due to erroneous distraction determination, and can reduce reliability and efficiency of warning provision.

SUMMARY OF THE INVENTION

The present invention is directed to providing an apparatus for a driver distraction warning in which determination parameters for providing a warning about a driver distraction situation are adaptively and automatically tuned by reflecting external information (driving environment and vehicle driving information) and the driver's internal information (gaze-related information), thereby increasing reliability and efficiency of warning provision, and a method of a driver distraction warning.

According to an aspect of the present invention, there is provided an apparatus for a driver distraction warning, which includes an input unit configured to receive visual field-related information, driving environment information, and driving-related information, a memory configured to store a warning providing program for a driver's distraction situation using the visual field-related information, the driving environment information, and the driving-related information, and a processor configured to execute the warning providing program. The processor changes warning determination parameters for driver distraction and provides a warning alarm about the driver distraction.

The processor may track a driver's gaze using the visual field-related information.

The processor may analyze feature information about central vision and peripheral vision of the driver, information about changes in the central vision and peripheral vision according to a pupil size, focal length change information, and focal length information for each position of the driver's gaze.

The processor may use vehicle speed information corresponding to the driving-related information to analyze behavior information.

The processor may use the visual field-related information, the driving environment information, and the driving-related information to determine a forward gaze area, and adaptively change the warning determination parameters that define a distraction warning timing and a distraction level change timing according to changes in viewing angle and focal length which are calculated in consideration of a pupil size change characteristic and a vehicle speed.

According to an aspect of the present invention, there is provided a method of a driver distraction warning, which includes an operation (a) of receiving driving environment information, driving-related information, and visual field-related information, an operation (b) of performing fusion analysis on the information received in the operation (a), and an operation (c) of determining whether driver distraction occurs and providing a warning alarm.

The operation (a) may include receiving a front image and brightness information serving as the driving environment information from a camera for photographing a view in front of a driving vehicle, and receiving at least one of driving behavior information and Global Positioning System (GPS) information serving as the driving-related information from the driving vehicle.

The operation (a) may include receiving driver's gaze information and pupil size information serving as the visual field-related information from a camera for photographing a driver.

The operation (b) may include fusing the driving environment information, the driving-related information, and the visual field-related information and analyzing the fused information, and setting parameters for providing warnings about the driver distraction.

The operation (b) may include performing calibration of the camera for photographing the view in front of the driving vehicle and the camera for photographing the driver, calculating a focal length for each position of a driver's gaze, determining a gaze area in consideration of the focal length, a change in pupil size, and vehicle speed information, and adaptively changing parameters for changing a warning provision timing and a warning level for the distraction.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The above-described objects, other objects, advantages, and features of the present invention and methods of achieving the same will be clearly understood with reference to the accompanying drawings and the following detailed embodiments.

However, the present invention is not limited to the embodiments to be disclosed below but may be implemented in various different forms. The following embodiments are merely provided to easily inform those skilled in the art of the objects, configuration, and effects of the present invention. The scope of the present invention is defined by the appended claims.

Meanwhile, the terms used herein are provided only to describe the embodiments of the present invention and not for purposes of limitation. In this specification, the singular forms include the plural forms unless the context clearly indicates otherwise. It will be understood that the terms "comprise" and/or "comprising," when used herein, specify some stated components, steps, operations and/or elements but do not preclude the presence or addition of one or more other components, steps, operations and/or elements.

Figure 1:
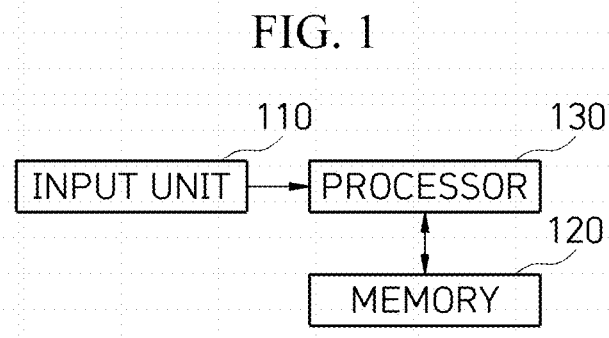
FIG. 1 illustrates an apparatus for a driver distraction warning according to an embodiment of the present invention.

FIG. 1 illustrates an apparatus for a driver distraction warning according to an embodiment of the present invention.

According to the embodiment of the present invention, without setting reference values of camera-based driver distraction determination parameters according to comprehensive definitions by a system designer, the determination parameters for driver distraction may be adaptively and automatically determined through biological-based driver state analysis and comprehensive analysis of external environment information, and a warning about the distraction to the driver may be to provided according to an optimum warning timing and warning level.

The causes of traffic accidents are classified into three factors such as a driver, a vehicle, and a road environment among which the driver is the most important factor.

Since the driver is a main subject of vehicle driving, the driver's cognitive delay, erroneous determination, distraction, and the like with respect to traffic conditions, which occur while driving, become main factors in the occurrence of accidents.

Most accidents due to non-compliance with safe driving are directly or indirectly related to driver behavior such as negligence of forward gaze. This is because most traffic information required for driving is obtained visually through the driver's eyes.

That is, it is important to provide the warning about driver distraction for negligence of forward gaze in consideration of visual characteristics such as the driver's visual acuity and visual field.

In the Road Traffic Act of Korea, aptitude criteria for visual acuity necessary for driving an automobile and the like are stipulated.

Visual acuity is the ability to identify objects or situations with an eye and physiologically refers to visual acuity of the fovea centralis of a retina. As the center of gaze moves away from the fovea centralis, visual acuity changes while sensitively responding.

Specifically, visual acuity is rapidly lowered when deviating from a gazing point (when deviating from the gazing point by 2°, visual acuity is lowered to ½, when deviating from the gazing point by 10°, the visual acuity is lowered to ⅕).

Visual acuity is divided into static visual acuity when looking at an object in a stationary state and dynamic visual acuity when looking at a moving object. Dynamic visual acuity when looking at a moving object or when looking at an object or situation while moving is lower than static visual acuity under the same conditions.

It is known that, when a driver having a static visual acuity of 1.2 sees a fixed object while driving at 50 km/h, dynamic visual acuity is lowered to 0.7, and while driving at 90 km/h, dynamic visual acuity is lowered to 0.5 or less.

In addition, since visual acuity at night is lowered by about 50% compared to that in daytime, a visible distance in which an object may be seen is further shortened.

Particularly, the visual acuity and the visible distance of the driver at night are physically limited by headlights of the vehicle. Generally, since an effective visible distance in front of the headlights ranges from 100 to 150 m for high beams and ranges from about 40 to 50 m for low beams, it is difficult to recognize road conditions or traffic conditions in front of the vehicle from a distance on local roads where there are no streetlights and the driver may only see with the headlights.

When speeding at night, it is difficult to see the surrounding situations smoothly due to the lowered visual acuity and when the driver encounters a danger suddenly appearing in front of the vehicle, a stopping distance is increased and it is highly likely to lead to an accident.

A focal length is changed according to a change in pupil size. When driving at night, the pupil size is increased, and thus light blurring occurs and a distance range for focusing is more limited than during daytime driving.

As the pupil size decreases, the focal length increases, and as the pupil size increases, the focal length decreases.

As the pupil size decreases, the focal length increases so that central vision decreases, and as the pupil size increases, the focal length decreases so that central vision increases.

A range between the left and right that can be seen by both eyes of a person is referred to as the visual field. A visual field where an image of an object is focused on the center of the retina and the object can be seen most clearly and accurately is referred to as central vision, and a visual field of a portion that receives visual information from an outer range of the gaze, that is, a portion that is not focused, is referred to as peripheral vision.

It is known that visual fields of both eyes of a person with normal visual acuity range from about 180 to 200°, a visual field of one eye, each left and right, is about 160°, and a range in which colors can be distinguished with both eyes is about 70°.

The visual field is also affected by a movement speed. For example, a visual field of a normal person in a stationary state ranges from about 180 to 200°, but a visual field of the driver is rapidly reduced to about 100° at a driving speed of about 40 km/h, to about 65° at a driving speed of about 70 km/h, and to about 40° at a driving speed of about 100 km/h.

Therefore, in high-speed driving such as speeding or the like, the driver can face a danger by not seeing or inadvertently passing vehicles, pedestrians, and other dangerous obstacles located on the front side of the driver.

According to the embodiment of the present invention, in consideration of different characteristics of visual field information for each driver (changes in focal length and viewing angle are correlated with the size of the pupil) and change characteristics of the viewing angle range according to the vehicle speed (as the vehicle speed increases, central vision decreases), whether driver distraction occurs may be determined by reflecting individual characteristics, and a warning for the distraction may be provided.

An input unit 110 receives information related to a visual field of a driver from a camera for photographing the driver.

The input unit 110 receives driving environment information (front image) from a camera for photographing the front of a driving vehicle and receives driving-related information (including at least one of vehicle speed information, steering wheel manipulation information, and turn signal indicator lighting information service as behavior information and including at least one of road information, tunnel information, time information, and lane information service as Global Positioning System (GPS) information) from the driving vehicle.

A processor 130 uses the visual field-related information, the driving environment information, and the driving-related information to change warning determination parameters for driver distraction and provides a warning alarm for the driver distraction.

The processor 130 uses at least one of the vehicle speed information, the steering wheel manipulation information, and the turn signal indicator lighting information to analyze the behavior information.

The processor 130 calculates a distance value for each position of the driver's gaze by performing calibration of the camera for photographing the view in front of the driving vehicle and the camera for photographing the driver.

The processor 130 analyzes feature information about the central vision and peripheral vision of the driver, information about changes in central vision and peripheral vision through analysis of the driver's pupil size, focal length change information according to changes in central vision, peripheral vision, and pupil size, and focal length information according to changes in position of the driver's gaze service as visual field-related information.

The processor 130 maps an image which is acquired using a front camera to the driver's gaze and calculates a distance value for position of the gaze.

The processor 130 uses the visual field-related information, the driving environment information, and the driving-related information to adaptively change front area parameters and adaptively change parameters that define a distraction warning timing and a distraction level change timing according to changes in vehicle speed, central vision, peripheral vision, and focal length.

Accordingly, it is possible to adaptively provide an alarm for the driver distraction according to the driving environment and driving situation.

According to the embodiment of the present invention, by analyzing a change in viewing angle and a change in focal length according to the driving speed, a size of a region of interest of the front area is changed according to the driving speed, and the warning timing and warning level for driver distraction are changed.

Further, in consideration of characteristics of the pupil size change according to the changes in driving speed and brightness value of the surrounding environment (daytime driving or night driving), the focal length change is analyzed, values of the pupil position in the central and peripheral vision are determined according to the focal length change, and the warning timing and the warning level for the driver distraction are changed.

Figure 2:
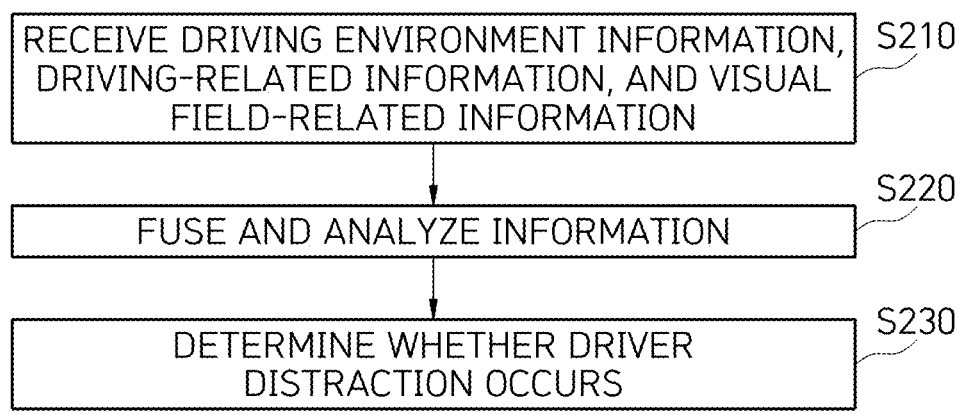
FIG. 2 illustrates a method of a driver distraction warning according to an embodiment of the present invention.

FIG. 2 illustrates a method of a driver distraction warning according to an embodiment of the present invention.

The method of the driver distraction warning according to the embodiment of the present invention includes operations of receiving driving environment information, driving-related information, and visual field-related information (S210), performing fusion analysis on the received information (S220), and determining whether driver distraction occurs (S230).

In operation S210, a front image and brightness information serving as driving environment information are received from a camera for photographing a view in front of a driving vehicle, and at least one of driving behavior information (vehicle speed information, steering wheel manipulation information, and turn signal indicator lighting information) and GPS information (road information, tunnel information, and time information) serving as the driving-related information is received from the driving vehicle.

In operation S210, driver's pupil size information serving as the visual field-related information is received from a camera for photographing the driver.

In operation S220, a parameter for providing a warning about the driver distraction is set by fusing and analyzing the driving environment information, the driving-related information, and the visual field-related information.

In operation S220, a distance value for each position of the driver's gaze is calculated through calibration (mapping of the acquired image to the driver's gaze) of the camera for photographing the view in front of the driving vehicle and the camera for photographing the driver.

In operation S220, in a personalization mode, personalized calibration is performed using an individual pupil size, and, in the non-personalization mode, representative value calibration is performed using a real-time data accumulation-based pupil size.

In operation S220, a gaze area is determined in consideration of an image vanishing point, a focal length for each position of the driver's gaze, a pupil size, and a vehicle speed.

In operation S220, front area parameters for distraction determination are set, and parameters for changing a warning provision timing and a warning level according to the distraction are set.

In operation S230, whether a driver distraction situation occurs is determined using the parameters which are adaptively changed using the visual field-related information, the driving environment information, and the driving-related information, and a warning alarm is provided.

Meanwhile, the method of the driver distraction warning according to the embodiment of the present invention may be implemented in a computer system or recorded on a recording medium. The computer system may include at least one processor, a memory, a user input device, a data communication bus, a user output device, and a storage. The above-described components perform data communication through the data communication bus.

The computer system may further include a network interface coupled to a network. The processor may include a central processing unit (CPU) or a semiconductor device that processes instructions stored in the memory and/or the storage.

The memory and the storage may include various types of volatile or nonvolatile storage media. For example, the memory may include a read-only memory (ROM) and a random-access memory (RAM).

Therefore, the method of the driver distraction warning according to the embodiment of the present invention may be implemented as a computer-executable method. When the method of the driver distraction warning according to the embodiment of the present invention is performed in a computer device, computer-readable instructions may perform the method of the driver distraction warning according to the present invention.

Meanwhile, the method of the driver distraction warning according to the present invention described above may be implemented as computer-readable code on a computer-readable recording medium. The computer-readable recording medium includes any type of recording medium in which data that may be read by a computer system is stored. For example, the computer-readable recording medium may include a ROM, a RAM, a magnetic tape, a magnetic disk, a flash memory, an optical data storage device, and the like. Further, the computer-readable recording medium may be distributed in computer systems connected through a computer communication network and may be stored and executed as code that may be read in a distributed manner.

According to the present invention, by adaptively and automatically tuning determination parameters for determining driver distraction, reliability and convenience of warning provision can be improved.

By adaptively determining a driver distraction warning timing and a distraction level change timing, performance of driver distraction determination logic can be improved.

Without being limited to the definitions of a system designer, it is possible to optimally tune driver distraction determination parameters in consideration of biological-based driver state analysis and external environment information.

Effects of the present invention are not limited to the above-described effects and other effects which have not been described may be clearly understood by those skilled in the art from the above descriptions.

What is claimed is:

1. An apparatus for a driver distraction warning, the apparatus comprising:
   an input unit configured to receive visual field-related information, driving environment information, and driving-related information;
   a memory configured to store a warning providing program for a driver's distraction situation using the visual field-related information, the driving environment information, and the driving-related information; and
   a processor configured to execute the warning providing program,
   wherein the processor is configured to change warning determination parameters for driver distraction and provide a warning alarm about the driver distraction, and
   wherein the processor is configured to use the visual field-related information, the driving environment information, and the driving-related information to determine a forward gaze area, and adaptively change the warning determination parameters that define a distraction warning timing and a distraction level change timing according to changes in viewing angle which are calculated in consideration of a pupil size change characteristic and a vehicle speed.

2. The apparatus of claim 1, wherein the processor tracks a driver's gaze using the visual field-related information.

3. The apparatus of claim 1, wherein the processor analyzes feature information about central vision and peripheral vision of the driver, information about changes in the central vision and peripheral vision according to a pupil size, focal length change information, and focal length information for each position of a driver's gaze.

4. The apparatus of claim 1, wherein the processor uses vehicle speed information corresponding to the driving-related information to analyze behavior information.

5. The apparatus of claim 1, wherein the processor adaptively changes the warning determination parameters according to changes in focal length which are calculated in consideration of the pupil size change characteristic and the vehicle speed.

6. A method of a driver distraction warning, the method comprising:
   an operation (a) of receiving driving environment information, driving-related information, and visual field-related information;
   an operation (b) of performing fusion analysis on the driving environment information, driving-related information, and visual field-related information received in the operation (a), the operation (b) further comprising:
      performing calibration of a camera for photographing a view in front of a driving vehicle and a camera for photographing a driver, determining a gaze area in consideration of a change in pupil size, and vehicle speed information, and adaptively changing parameters for changing a warning provision timing and a warning level for a distraction; and
   an operation (c) of determining whether driver distraction occurs and providing a warning alarm based on the adaptively changed parameters.

7. The method of claim 6, wherein the operation (a) includes receiving a front image and brightness information serving as the driving environment information from a camera for photographing a view in front of a driving vehicle, and receiving at least one of driving behavior information and Global Positioning System (GPS) information serving as the driving-related information from the driving vehicle.

8. The method of claim 6, wherein the operation (a) includes receiving driver's gaze information and pupil size information serving as the visual field-related information from a camera for photographing a driver.

9. The method of claim 6, wherein the operation (b) includes fusing and analyzing the driving environment information, the driving-related information, and the visual field-related information and setting parameters for providing warnings about the driver distraction.

10. The method of claim 9, wherein the operation (b) further comprises:
    calculating a focal length for each position of a driver's gaze; and
    determining the gaze area in consideration of the focal length, the change in pupil size, and the vehicle speed information.

* * * * *